US012722985B1

(12) United States Patent
Hu et al.

(10) Patent No.: US 12,722,985 B1
(45) Date of Patent: Sep. 1, 2026

(54) METHOD FOR REDUCING RISKS OF COMPOSITE POLLUTANTS IN SEWAGE

(71) Applicant: Nanjing University, Nanjing (CN)

(72) Inventors: Haidong Hu, Nanjing (CN); Minghao Yang, Nanjing (CN); Yuanji Shi, Nanjing (CN); Hongqiang Ren, Nanjing (CN)

(73) Assignee: Nanjing University, Nanjing (CN)

( * ) Notice: Subject to any disclaimer, the term of this patent is extended or adjusted under 35 U.S.C. 154(b) by 0 days.

(21) Appl. No.: 19/083,326

(22) Filed: Mar. 18, 2025

(30) Foreign Application Priority Data

Feb. 28, 2025 (CN) ......................... 202510229704.4

(51) Int. Cl.
*C02F 1/00* (2023.01)
*B01J 20/20* (2006.01)
(Continued)

(52) U.S. Cl.
CPC ............... *C02F 1/008* (2013.01); *B01J 20/20* (2013.01); *B01J 20/3021* (2013.01);
(Continued)

(58) Field of Classification Search
CPC ...... C02F 1/008; C02F 1/283; C02F 2101/34; C02F 2101/36; C02F 2101/38;
(Continued)

(56) References Cited

U.S. PATENT DOCUMENTS

2016/0123882 A1 5/2016 Gilmore et al.
2021/0155510 A1* 5/2021 Hassanzadeh ........ C02F 1/5209
2024/0400412 A1* 12/2024 Grabbe ................ C02F 1/5245

FOREIGN PATENT DOCUMENTS

CA 2221851 A1 6/1988
CN 1513777 A 7/2004
(Continued)

OTHER PUBLICATIONS

Shi et al., Confined water-encapsulated activated carbon for capturing short-chain perfluoroalkyl and polyfluoroalkyl substances from drinking water PNAS 2023 vol. 120 No. 27 pp. 1-10. (Year: 2023).*

(Continued)

*Primary Examiner* — Pranav N Patel
(74) *Attorney, Agent, or Firm* — Zhu Lehnhoff LLP

(57) ABSTRACT

Provided is a method for reducing risks of composite pollutants in sewage, and belongs to the technical field of sewage treatment. The method includes the following steps: S1, measuring the concentration of dissolved organic carbon and the total concentration of composite pollutants in sewage; S2, measuring the proportion P of dissolved organic matter molecules with a modified aromaticity index ≥0.5 in sewage; S3, selecting a corresponding dual-media adsorption column filling scheme based on the ratio of the concentration of dissolved organic carbon to the total concentration of composite pollutants and the P. The method can upgrade the existing activated carbon adsorption process in situ, effectively reduce risks of composite pollutants in sewage, and effectively ensure the effluent safety of sewage treatment plants.

8 Claims, 3 Drawing Sheets

(51) Int. Cl.

| | |
|---|---|
| ***B01J 20/30*** | (2006.01) |
| ***C02F 1/28*** | (2023.01) |
| *C02F 101/34* | (2006.01) |
| *C02F 101/36* | (2006.01) |
| *C02F 101/38* | (2006.01) |

(52) U.S. Cl.
CPC ........... *B01J 20/3078* (2013.01); *C02F 1/283* (2013.01); *C02F 2101/34* (2013.01); *C02F 2101/36* (2013.01); *C02F 2101/38* (2013.01); *C02F 2101/40* (2013.01); *C02F 2209/21* (2013.01)

(58) Field of Classification Search
CPC ... C02F 2101/40; C02F 2209/21; B01J 20/20; B01J 20/3021; B01J 20/3078
See application file for complete search history.

(56) References Cited

FOREIGN PATENT DOCUMENTS

| | | | |
|---|---|---|---|
| CN | 103495385 | A | 1/2014 |
| CN | 107262063 | A | 10/2017 |
| CN | 107855106 | A | 3/2018 |
| CN | 109824167 | A | 5/2019 |
| CN | 114054038 | B | 9/2022 |
| CN | 116143221 | A | 5/2023 |
| CN | 117626889 | A | 3/2024 |
| CN | 119191531 | A | 12/2024 |
| JP | 2006181397 | A | 7/2006 |
| KR | 20180046545 | A | 5/2018 |

OTHER PUBLICATIONS

Noredinvand et al. (Desalination and Water Treatment 57 (2016) 20792-20799) (Year: 2016).*
Wang et al. (Environmental Science and Ecotechnology 21 (2024) 100392) (Year: 2024).*
Shimabuku et al. (Environ. Sci. Technol. 2017, 51, 2676-2684) (Year: 2017).*
Patent Search Report, prepared by Beijing Zhanqiao Intellectual Property Agency, dated May 15, 2025.
Notice of Grant of Patent Rights, issued in CN202510229704.4 (priority application), by CNIPA, dated May 14, 2025.
Examination Report, issued in CN202510229704.4 (priority application), by CNIPA, dated Apr. 30, 2025.

* cited by examiner

METHOD FOR REDUCING RISKS OF COMPOSITE POLLUTANTS IN SEWAGE

REFERENCE TO RELATED APPLICATIONS

The present application claims the priority of Chinese patent application No. 202510229704.4, filed on 2025 Feb. 28, the entire disclose of which is incorporated herein by reference.

TECHNICAL FIELD

The present disclosure relates to the technical field of sewage treatment, and in particular to a method for reducing risks of composite pollutants in sewage.

BACKGROUND

Extensive research shows that the combined risk of composite pollutants is often significantly higher than the safety level, even if the pollution risk of a single pollutant is lower than the safety level. A sewage treatment plant is one of the main media between these pollutants and environmental water, but it is worrying that it is difficult for a traditional sewage treatment process to effectively remove these composite pollutants. Hydrophilic pollutants are often more likely to "escape" in a sewage treatment system because of their high polarity and high mobility, thus entering the environmental water. Some of these composite pollutants accumulate as persistent organic pollutants through the food chain and pose a stronger health risk to organisms. Although some of these composite pollutants can be degraded by physical and biological methods, the composite pollutants often produce more toxic secondary products. Therefore, it is of great significance to effectively remove such composite pollutants in a sewage treatment plant to maintain the safety of water environment.

An activated carbon treatment process is a commonly used tertiary treatment process in sewage treatment plants at present, but the treatment effect of activated carbon on hydrophilic composite pollutants is not satisfactory because the mechanism of action mainly involves hydrophobic interaction and electrostatic attraction. In addition, there are a large number of Dissolved Organic Matter (DOM) molecules in the practical sewage, which are more likely to bind to the adsorption sites on activated carbon and block the pores of activated carbon. As a result, it is difficult for the activated carbon treatment process to play a role in dealing with such hydrophilic composite pollutants in the practical sewage treatment process. In recent years, more and more new adsorption materials have been developed and applied to the practical sewage scene to remove hydrophilic composite pollutants. Chinese Patent Application CN202010663210.4 discloses a method for synchronously removing the composite pollution of antibiotics and heavy metals in water. According to the method, a triblock copolymer F127 is used to perform the auxiliary synthesis of a silica template. Subsequently, glucose is carbonized under acidic conditions, and then the silica template is removed under alkaline conditions, so as to obtain a glucose mesoporous carbon material. The application in the effluent of a pig waste water treatment process shows that the mesoporous carbon material can remove more than 80% of hydrophilic composite pollutants (tetracycline, ciprofloxacin and sulfadiazine), and can remove heavy metal ions synchronously. However, the preparation of the adsorbent used in the method requires strong acid, strong alkali and high temperature calcination. The process is complex, which is difficult to directly adapt to the existing sewage treatment process.

To sum up, in the actual treatment process, there are many types of practical sewage, and the composition of composite pollutants in each type of sewage is different. At the same time, due to the high polarity and high mobility of composite pollutants, the adsorption treatment methods in the prior art, such as those using activated carbon, have poor treatment effects on hydrophilic composite pollutants. Moreover, the modified activated carbon in the prior art is not suitable for various composite pollutants that may exist in various types of practical sewage. Therefore, the existing adsorption technologies have not carried out targeted design for filling the medium of the adsorption column, so that it is difficult to meet the requirements of efficient and practical treatment.

SUMMARY

In order to solve the above problems, the present disclosure provides a method for reducing risks of composite pollutants in sewage, which can effectively remove hydrophilic composite pollutants in various sewage environments.

A method for reducing risks of composite pollutants in sewage is provided, including the following steps:

S1, measuring the concentration $C_{DOC}$ of dissolved organic carbon and the total concentration $C_{HCP}$ of composite pollutants in sewage;

S2, calculating the proportion P of the number of dissolved organic matter molecules with a modified aromaticity index $AI_{mod} \geq 0.5$ in sewage to the total number of dissolved organic matter molecules in sewage;

S3, determining the filling ratio of the two media in a dual-media adsorption column based on the ratio of the concentration $C_{DOC}$ of dissolved organic carbon to the total concentration $C_{HCP}$ of composite pollutants and the P, and then performing risk reduction treatment on the sewage by using the dual-media adsorption column.

Note: the above method can determine an appropriate adsorption column to perform adsorption treatment on sewage according to the specific composite pollution index in sewage, which is strong in pertinence. The proportion P can be used to express the content of aromatic rings in organic compounds, and the proportion P reflects and analyzes the behavior, source and potential ecological impact of molecules in the environment. To sum up, the above method adjusts the filling ratio of dual media so as to reduce risks of composite pollutants in practical sewage with different pollution characteristics, which facilitates upgrading the existing activated carbon adsorption device in practical sewage treatment plants in situ and is wide in applicability and excellent in effect.

Further, the sewage is the secondary effluent of a sewage treatment plant and the effluent from a subsequent process stage of the secondary effluent.

Note: the above effluent can avoid the influence of pollutants in water before the secondary effluent on the adsorption column, such as blockage and damage.

Further, the composite pollutants in Step S1 are organic matters in sewage with a logarithm of an octanol-water partition coefficient $\log K_{ow} \leq 2.5$.

Note: the Octanol-Water Partition Coefficient ($K_{ow}$) is a parameter to measure the partition capacity of organic compounds between octanol and water, which reflects the hydrophobicity or lipophilicity of compounds. The higher the value of $K_{ow}$, the easier it is for the compound to be partitioned into octanol, that is, the more hydrophobic the compound is. On the contrary, the lower the value of $K_{ow}$, the more hydrophilic the compound is. Aiming at hydrophilic composite pollutants, the present disclosure can treat the more hydrophilic organic matters in water according to the sieving method to reduce pollution risks.

Further, the method for calculating the modified aromaticity index $AI_{mod}$ in S2 is as follows:

for each dissolved organic matter molecule in sewage, determining the number of atoms of each element in the dissolved organic matter molecule first, and then substituting the number of atoms of each element into the following formula (1) to calculate the modified aromaticity index;

$$AI_{mod} = \frac{1 + C_n - 0.5O_n - S_n - 0.5(N_n + P_n + H_n)}{C_n - 0.5O_n - S_n - N_n - P_n} \quad (1)$$

in formula (1), $AI_{mod}$ is a modified aromaticity index, $C_n$ is the number of atoms of carbon, $H_n$ is the number of atoms of hydrogen, $O_n$ is the number of atoms of oxygen, $N_n$ is the number of atoms of nitrogen, $S_n$ is the number of atoms of sulfur, and $P_n$ is the number of atoms of phosphorus;

the method for calculating the proportion P is shown in formula (2):

$$P = \frac{N_{AI_{mod} \geq 0.5}}{N_{Total}} \quad (2)$$

in formula (2), $N_{AI_{mod} \geq 0.5}$ is the number of dissolved organic matter molecules with a modified aromaticity index≥0.5 in a sewage water sample, and $N_{Total}$ is the total number of dissolved organic matter molecules in the sewage water sample.

Note: the above calculation formula can express the content of aromatic rings in organic compounds according to the number of dissolved organic matter molecules, which can help to identify and distinguish different types of organic compounds. The above setting can study and analyze the behavior, source and potential ecological impact of dissolved organic matter molecules in the environment.

Further, the two media in the dual-media adsorption column are activated carbon and confined water modified activated carbon, respectively, and the dual-media adsorption column is filled with activated carbon and confined water modified activated carbon from bottom to top in sequence.

Note: the above two media can be applied to many practical sewage treatment processes and have good treatment effects.

Further, a method for preparing the confined water modified activated carbon includes the following steps:

first, crushing, sieving and cleaning activated carbon, and then drying the activated carbon at 110° C. for 11-24 hours to obtain dried activated carbon; subsequently, taking out the dried activated carbon and placing the dried activated carbon in a constant temperature and humidity chamber with the temperature of 22-27° C. and the humidity of 95-200% for 40-72 hours for modification; and after the modification, taking out the activated carbon and placing the activated carbon in a constant temperature oven at 25-40° C. for 15-45 min to obtain the confined water modified activated carbon.

Note: the above method can improve the adsorption performance of activated carbon and optimize the pore structure. Under the condition of high humidity, water molecules may enter the micropores of activated carbon, which will result in expansion of pores and increase in the pore volume and the specific surface area. Humidity treatment may promote the formation of functional groups on the surface of activated carbon, such as hydroxyl groups and carboxyl groups. The functional groups can enhance the chemical adsorption capacity of activated carbon for specific pollutants. Under the condition of high humidity, confined water may be formed in the pores of activated carbon. The existence of confined water may change the micro-environment in the pores and provide more adsorption sites, thus affecting adsorption kinetics and selectivity. The existence of confined water may lead to the orderly arrangement of water molecules in pores, which can improve the adsorption for composite pollutants.

Further, determining the filling ratio of the two media in a dual-media adsorption column for adsorbing sewage based on the ratio of the concentration of dissolved organic carbon to the total concentration of composite pollutants and the P includes:

when $C_{DOC}/C_{HCP} \leq 1000$ and P≤20% in sewage, the filling ratio of the activated carbon to the confined water modified activated carbon is 1:1;

when $C_{DOC}/C_{HCP} \leq 1000$ and P>20% in sewage, the filling ratio of the activated carbon to the confined water modified activated carbon is 2:1;

when $C_{DOC}/C_{HCP} > 1000$ in sewage, the filling ratio of the activated carbon to the confined water modified activated carbon is 4:1.

Note: the above setting can set the ratio of the treatment medium based on the ratio of the concentration of dissolved organic carbon to the total concentration of composite pollutants and the P, so as to be more suitable for the treatment process of composite pollutants in sewage.

Further, a particle size of the obtained activated carbon is 0.3-0.5 mm after the crushing and sieving. It is preferable that the quality of sewage entering the dual-media adsorption column meets the requirements of $C_{DOC}$<20 mg/L and turbidity <10 NTU.

Note: the above particle size setting can be applied to the treatment process of the present disclosure. The above restrictions on the water quality of sewage can result in less damage of sewage to the dual-media adsorption column, and the dual-media adsorption column has an excellent treatment effect on composite pollutants in sewage for the water quality in the above range.

Further, the method for performing risk reduction treatment on the sewage by using the dual-media adsorption column in S3 includes: introducing the sewage into the adsorption column and allowing the sewage to stand for 30-60 min, and completing the risk reduction treatment.

Note: the above standing adsorption treatment can effectively adsorb composite pollutants in sewage and reduce potential risks in sewage.

Further, when the sewage belongs to secondary effluent, the sewage is introduced into the adsorption column and is allowed to stand for 45-60 min; when the sewage belongs to the effluent from the subsequent process stage of the secondary effluent, the sewage is introduced into an adsorption column and is allowed to stand for 30-44 min; wherein the secondary effluent subsequent process stage comprises a coagulation sedimentation tank, a cloth filter, a denitrification filter and an ultraviolet/ozone disinfection tank.

Note: the above differentiated setting for different effluent time can reduce the standing time and save the cost while ensuring the sewage treatment effect.

Further, in the above technical scheme, risks of composite pollutants are calculated by a total toxicity unit ($TU_{sum}$), and the calculation formula is as follows:

$$TU_{sum} = \sum_{i=1}^{n} TU_i = \sum_{i=1}^{n} \frac{MEC_i}{EC_{50,i}} \quad (3)$$

where $TU_{sum}$ represents a total toxic unit of sewage, and $TU_i$ represents a toxic unit of an i-th pollutant; $MEC_i$ represents the detection concentration of an i-th pollutant in sewage;

and $EC_{50,i}$ represents the median effective concentration of an i-th pollutant.

Note: the total toxicity risk is obtained by the above calculation method. The total toxicity risk is an index used to evaluate risks of composite pollutants in water and can measure risks of composite pollutants in sewage. That is, the total toxicity unit can be used as a quantitative evaluation of the effects before and after treatment according to the present disclosure.

The present disclosure has the following beneficial effects. The present disclosure can determine an appropriate adsorption column to perform treatment according to the composite pollution situation in sewage, which can improve the pertinence in the sewage treatment process. The proportion P can be used to express the content of aromatic rings in organic compounds, and reflect and analyze the behavior, source and potential ecological impact of molecules in the environment. At the same time, the above method adjusts the filling ratio of dual media so as to reduce risks of composite pollutants in practical sewage with different pollution characteristics, which facilitates upgrading the existing activated carbon adsorption device in practical sewage treatment plants in situ and is wide in applicability and excellent in effect. At the same time, the present disclosure uses the modified activated carbon to reduce risks of composite pollutants in practical sewage, and has the advantages of being low in price, green and low in carbon.

DETAILED DESCRIPTION OF THE EMBODIMENTS

In order to further illustrate the ways and effects of the present disclosure, the technical scheme of the present disclosure will be described clearly and completely with reference to experiments.

Figure 1:
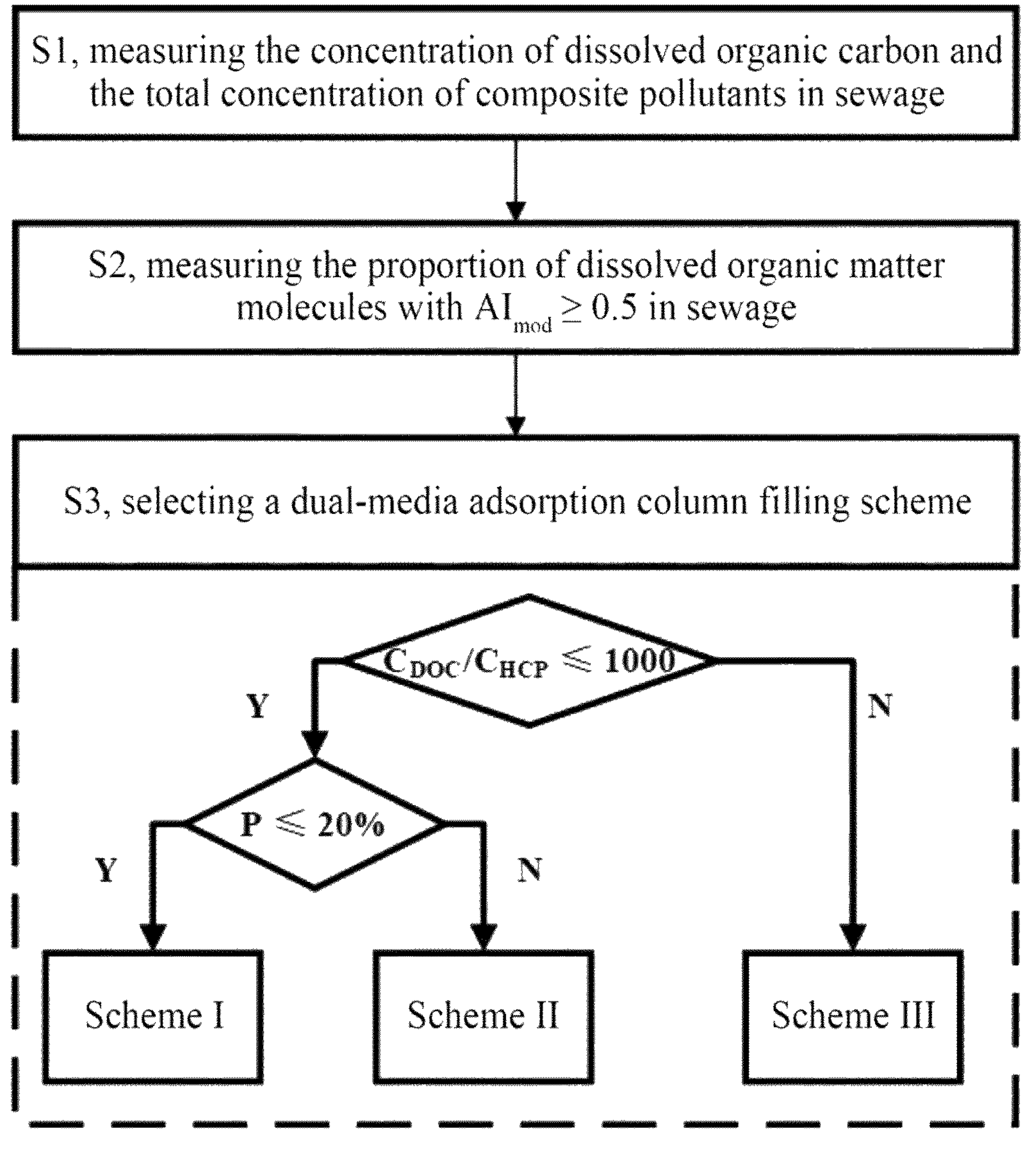
FIG. 1 is a schematic diagram of a method according to Embodiment 1 of the present disclosure.

Embodiment 1: as shown in FIG. 1, a method for reducing risks of composite pollutants in sewage includes the following steps.

S1, the concentration $C_{DOC}$ of dissolved organic carbon and the total concentration $C_{HCP}$ of composite pollutants in sewage are measured.

The sewage is the secondary effluent of a sewage treatment plant and the effluent from a subsequent process stage of the secondary effluent. The composite pollutants are organic matters in sewage with a logarithm of an octanol-water partition coefficient $\log K_{ow} \leq 2.5$.

S2, the proportion P of the number of dissolved organic matter molecules with a modified aromaticity index $AI_{mod} \geq 0.5$ in sewage to the total number of dissolved organic matter molecules in sewage is calculated.

The method for calculating the modified aromaticity index $AI_{mod}$ in S2 is as follows:

for each dissolved organic matter molecule in sewage, determining the number of atoms of each element in the dissolved organic matter molecule first, and then substituting the number of atoms of each element into the following formula (1) to calculate the modified aromaticity index;

$$AI_{mod} = \frac{1 + C_n - 0.5O_n - S_n - 0.5(N_n + P_n + H_n)}{C_n - 0.5O_n - S_n - N_n - P_n} \quad (1)$$

in formula (1), $AI_{mod}$ is a modified aromaticity index, $C_n$ is the number of atoms of carbon, $H_n$ is the number of atoms of hydrogen, $O_n$ is the number of atoms of oxygen, $N_n$ is the number of atoms of nitrogen, $S_n$ is the number of atoms of sulfur, and $P_n$ is the number of atoms of phosphorus.

The method for calculating the proportion P is shown in formula (2):

$$P = \frac{N_{AI_{mod} \geq 0.5}}{N_{Total}} \quad (2)$$

in formula (2), $N_{AI_{mod} \geq 0.5}$ is the number of dissolved organic matter molecules with a modified aromaticity index $\geq 0.5$ in a sewage water sample, and $N_{Total}$ is the total number of dissolved organic matter molecules in the sewage water sample.

S3, the filling ratio of the two media in a dual-media adsorption column is determined based on the ratio of the concentration $C_{DOC}$ of dissolved organic carbon to the total concentration $C_{HCP}$ of composite pollutants and the P, and then risk reduction treatment is performed on the sewage by using the dual-media adsorption column.

The two media in the dual-media adsorption column are activated carbon and confined water modified activated carbon, respectively, and the dual-media adsorption column is filled with activated carbon and confined water modified activated carbon from bottom to top in sequence. The quality of sewage entering the dual-media adsorption column meets the requirements of $C_{DOC}$<20 mg/L and turbidity <10 NTU.

A method for preparing the confined water modified activated carbon includes the following steps:

first, crushing, sieving and cleaning activated carbon, and then drying the activated carbon at 110° C. for 12 hours to obtain dried activated carbon; subsequently, taking out the dried activated carbon and placing the dried activated carbon in a constant temperature and humidity chamber with the temperature of 25° C. and the humidity of 98% for 48 hours for modification; and after the modification, taking out the activated carbon and placing the activated carbon in a constant temperature oven at 30° C. for 35 min to obtain the confined water modified activated carbon.

A particle size of the obtained activated carbon is 0.3-0.5 mm after the crushing and sieving.

In the embodiment of the present disclosure, determining the filling ratio of the two media in a dual-media adsorption column for adsorbing sewage based on the ratio of the concentration of dissolved organic carbon to the total concentration of composite pollutants and the P includes:

when $C_{DOC}/C_{HCP} \leq 1000$ and P≤20% in sewage, the filling ratio of the activated carbon to the confined water modified activated carbon is 1:1;

when $C_{DOC}/C_{HCP} \leq 1000$ and P>20% in sewage, the filling ratio of the activated carbon to the confined water modified activated carbon is 2:1;

when $C_{DOC}/C_{HCP} > 1000$ in sewage, the filling ratio of the activated carbon to the confined water modified activated carbon is 4:1.

The method for performing risk reduction treatment on the sewage by using the dual-media adsorption column includes: introducing the sewage into the adsorption column and allowing the sewage to stand for 30-60 min, and completing the risk reduction treatment.

Specifically, when the sewage belongs to secondary effluent, the sewage is introduced into the adsorption column and is allowed to stand for 55 min.

In the above technical scheme, risks of composite pollutants are calculated by a total toxicity unit ($TU_{sum}$), and the calculation formula is as follows:

$$TU_{sum} = \sum_{i=1}^{n} TU_i = \sum_{i=1}^{n} \frac{MEC_i}{EC_{50,i}} \quad (3)$$

where $TU_{sum}$ represents a total toxic unit of sewage, and $TU_i$ represents a toxic unit of an i-th pollutant; $MEC_i$ represents the detection concentration of an i-th pollutant in sewage; and $EC_{50,i}$ represents the median effective concentration of an i-th pollutant. The above calculation method can measure risks of composite pollutants in sewage. Moreover, the total toxicity unit can be used as an index used to quantify and evaluate the effects before and after treatment according to the present disclosure.

Embodiments:

The method of Embodiment 1 is used to illustrate the effect through an example of the actual process as follows. The used sewage comes from the secondary effluent of a municipal sewage treatment plant in a south city, and the basic water quality characteristics of the secondary effluent are as follows: the average pH value is 7.24, the average dissolved organic carbon value is 21.07 mg/L, and the average turbidity value is 5.73 NTU.

The simulated waste water is treated by the method in Embodiment 1 of the present disclosure, and the implementation results obtained by the specific steps are as follows.

S1, the sewage sample is collected, and the concentration of dissolved organic carbon is measured to be 13.21 mg/L, that is, $C_{DOC}$=13.21 mg/L; and the total concentration of composite pollutants is measured to be 5600.9 ng/L, that is, $C_{HCP}$=5600.9 ng/L.

S2, the proportion P of the number of Dissolved Organic Matter (DOM) molecules with a modified aromaticity index $AI_{mod} \geq 0.5$ in sewage to the total number of dissolved organic matter molecules in sewage is measured. A total of 7247 DOM molecules are identified using the formula $$AI_{mod} = \frac{1 + C_n - 0.5O_n - S_n - 0.5(N_n + P_n + H_n)}{C_n - 0.5O_n - S_n - N_n - P_n}. \quad (1)$$

Figure 2:
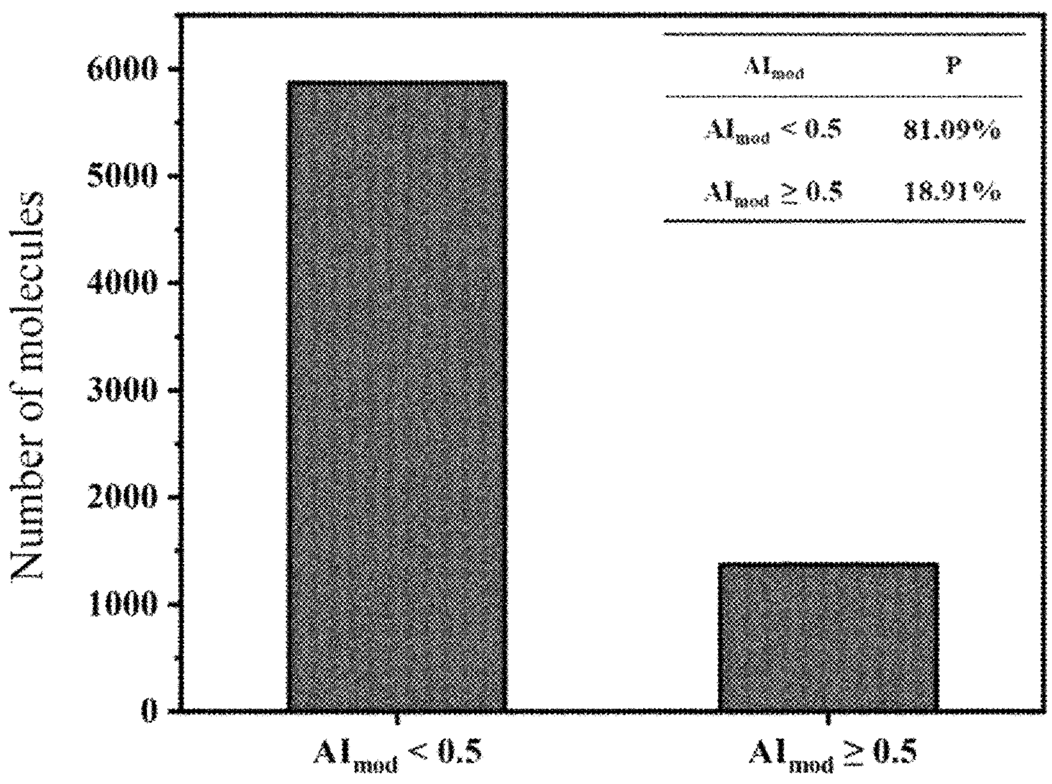
FIG. 2 is the $AI_{mod}$ distribution of DOM molecules in a secondary effluent sample in Embodiment 1 of the present disclosure.

The $AI_{mod}$ of the above molecules is calculated, in which the result is shown in FIG. 2. The proportion of DOMs with a modified aromaticity index $AI_{mod} \geq 0.5$ in water samples is calculated to obtain P=18.91%.

S3, an adsorption column filled with activated carbon and confined water modified activated carbon in a ratio of 4:1 is selected based on the ratio of the concentration of dissolved organic carbon to the total concentration of composite pollutants ($C_{DOC}/C_{HCP}$=2359) and P(P=18.91%), and the specific operation steps are as follows.

(1) activated carbon is crushed and sieved to 0.3-0.5 mm, cleaning the activated carbon, and drying the activated carbon at 110° C. for 12 hours thoroughly; subsequently, the dried activated carbon is taken out and placed in a constant temperature and humidity chamber with the temperature of 25° C. and the humidity of 98% for 48 hours; and after the modification, the activated carbon is taken out and placed in a constant temperature oven at 30° C. for 35 min.

(2) the dual-media adsorption column is filled with activated carbon and confined water modified activated carbon from bottom to top in sequence. The filling ratio is that activated carbon:confined water modified activated carbon=4:1.

(3) the $C_{DOC}$=13.21 mg/L<20 mg/L and the turbidity=5.73 NTU<10 NTU in the sewage, which meets the requirements of the water quality of sewage entering the dual-media adsorption column. Sewage enters the adsorption column from bottom to top via a peristaltic pump, and the treatment time is 55 min.

The average concentration and the effluent risk of composite pollutants treated by raw water (control group 1), the activated carbon adsorption column (control group 2), the confined water modified activated carbon adsorption column (control group 3) and the dual-media adsorption column (Embodiment 1) are shown in Table 1 and Table 2, respectively.

With reference to Table 1 and Table 2, after the treatment by the activated carbon adsorption column (control group 2), the concentration of a plurality of composite pollutants is reduced by 22-82%, and the overall effluent risk is 0.0647 T.U.; after the treatment by the confined water modified activated carbon adsorption column (control group 3), the concentration of composite pollutants is reduced by 33-86%, and the overall effluent risk is 0.0381 T.U. After upgrading by this method, the dual-media adsorption column with the activated carbon: the confined water modified activated carbon=4:1 is selected. After treatment, the pollutant concentration is reduced by 56-92%, and the overall effluent risk is 0.0214 T.U.

Therefore, after upgrading by this method, the treatment effect is significantly improved, and the overall effluent risk can be significantly reduced after the treatment by the dual-media adsorption column, and the effluent risk is reduced from 0.0647 T.U. (the activated carbon adsorption column) and 0.0381 T.U. (the confined water modified activated carbon adsorption column) to 0.0214 T.U. (the dual-media adsorption column), which is reduced by 67% and 44%, respectively. The risks of composite pollutants in sewage are reduced significantly.

TABLE 1

Concentration of Composite Pollutants in Effluent Treated by the Adsorption Column in Embodiment 1

| Concentration of composite pollutants (ng/L) | Raw water (control group 1) | Effluent from the activated carbon adsorption column (control group 2) | Effluent from the confined water modified activated carbon adsorption column (control group 3) | Effluent from the dual-media adsorption column (4:1) (Embodiment 1) |
|---|---|---|---|---|
| Erythromycin | 704.2 | 401.3 | 366.1 | 232.3 |
| Carbamazepine | 215.1 | 38.7 | 45.2 | 17.2 |
| Salicylic acid | 69.5 | 26.9 | 29.0 | 15.9 |
| Metoprolol | 162.8 | 94.0 | 90.7 | 55.1 |
| Acetylsalicylic acid | 142.4 | 98.0 | 90.9 | 75.3 |
| Chloromycetin | 232.6 | 106.7 | 83.5 | 37.1 |
| Trimethoprim | 568.4 | 215.8 | 170.4 | 90.9 |
| Dagenan | 146.1 | 84.7 | 97.8 | 40.9 |
| Acetaminophen | 364.7 | 283.9 | 207.5 | 160.2 |
| Ofloxacin | 714.5 | 449.8 | 178.5 | 114.2 |
| Norfloxacin | 469.4 | 258.0 | 248.6 | 70.4 |
| Sulfadiazine | 424.1 | 313.8 | 178.1 | 93.3 |
| Tetracycline | 1387.1 | 929.3 | 194.2 | 111.0 |

TABLE 2

Total Risk of Raw Water and Effluent Treated by the Adsorption Column in Embodiment 1

| | Raw water (control group 1) | Effluent from the activated carbon adsorption column (control group 2) | Effluent from the confined water modified activated carbon adsorption column (control group 3) | Effluent from the dual-media adsorption column (4:1) (Embodiment 1) |
|---|---|---|---|---|
| Total Risk of Effluent (T.U.) | 0.1067 | 0.0647 | 0.0381 | 0.0214 |

To sum up, by comparing the control group 1 with Embodiment 1, it can be seen that the adsorption (removal) effect of the composite pollutants using the method of Embodiment 1 of the present disclosure is better, and the removal rate can be improved by 2-3 times compared with the control group 1. The reason is that in Embodiment 1, the adsorption column is used for treatment, which shows that the adsorption column in Embodiment 1 can effectively remove composite pollutants.

By comparing the control group 2 and the control group 3 with Embodiment 1, it can be seen that the removal rate of various pollutants is significantly improved after using Embodiment 1 of the present disclosure to remove the composite pollutants, which shows that the adsorption effect of the adsorption column obtained by the dual-media ratio in Embodiment 1 of the present disclosure is better than that of the direct use of activated carbon or the direct use of modified activated carbon. The reason is that the method in Embodiment 1 can effectively remove the composite pollutants according to their characteristics using the dual-media adsorption column, which is a technical effect that cannot be achieved by a treatment method that has not been envisaged in the prior art where only the activated carbon modification is carried out.

Embodiment 2: different from Embodiment 1, the sewage used in the embodiment comes from the secondary effluent of a municipal sewage treatment plant in a coastal city, and the basic water quality characteristics of the secondary effluent are as follows: the average pH value is 8.17, the average dissolved organic carbon value is 8.21 mg/L, and the average turbidity value is 6.28 NTU. By adding the target pollutants, the average concentration of each pollutant in the obtained sewage is shown in Table 3.

The simulated waste water is treated by the method of the present disclosure, and the specific steps are as follows.

S1, the sewage sample is collected, and the concentration of dissolved organic carbon is measured to be 5.17 mg/L, that is, $C_{DOC}$=5.17 mg/L; and the total concentration of composite pollutants is measured to be 11998.17 ng/L, that is, $C_{HCP}$=11998.17 ng/L.

S2, the proportion P of the number of Dissolved Organic Matter (DOM) molecules with a modified aromaticity index $AI_{mod} \geq 0.5$ in sewage to the total number of dissolved organic matter molecules in sewage is measured. A total of 11716 DOM molecules are identified using the formula $$AI_{mod} = \frac{1 + C_n - 0.5O_n - S_n - 0.5(N_n + P_n + H_n)}{C_n - 0.5O_n - S_n - N_n - P_n}. \quad (1)$$

Figure 3:
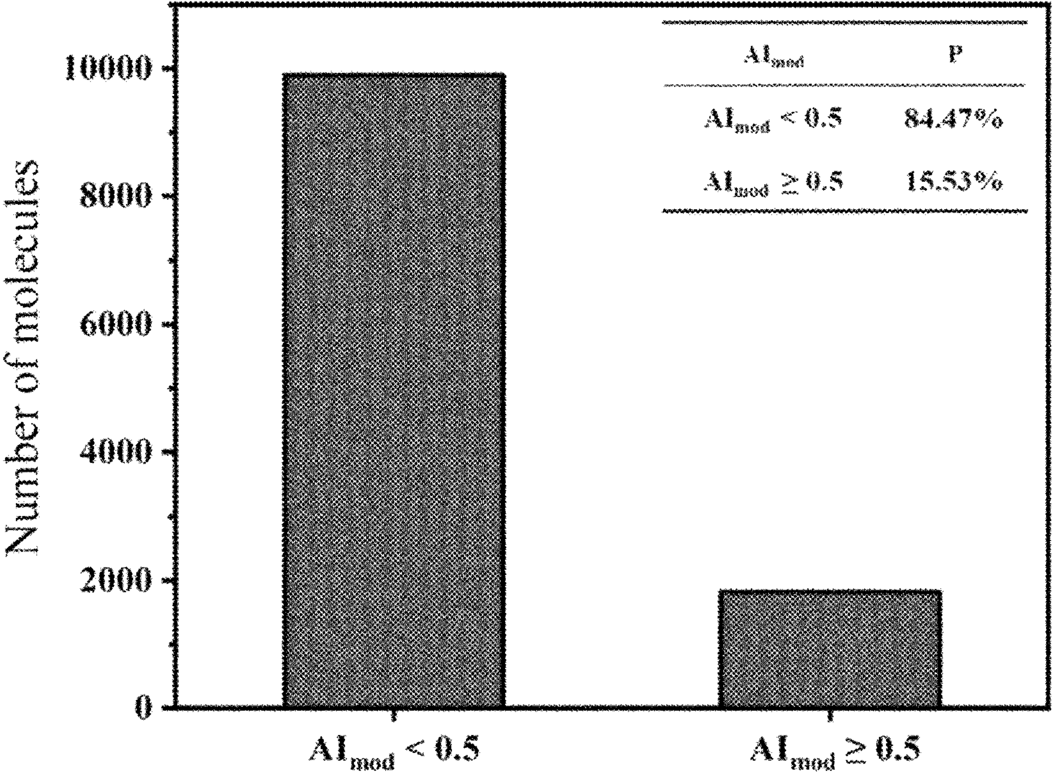
FIG. 3 is the $AI_{mod}$ distribution of DOM molecules in a secondary effluent sample in Embodiment 2 of the present disclosure.

The $AI_{mod}$ of the above molecules is calculated, in which the result is shown in FIG. 3. The proportion of DOMs with a modified aromaticity index $AI_{mod} \geq 0.5$ in water samples is calculated to obtain P=15.53%.

S3, an adsorption column filled with activated carbon and confined water modified activated carbon in a ratio of 1:1 is selected based on the ratio of the concentration of dissolved organic carbon to the total concentration of composite pollutants ($C_{DOC}/C_{HCP}$=431) and P(P=15.53%), and the specific operation steps are as follows.

(1) activated carbon is crushed and sieved to 0.3-0.5 mm, cleaning the activated carbon, and drying the activated carbon at 110° C. for 20 hours thoroughly; subsequently, the dried activated carbon is taken out and placed in a constant temperature and humidity chamber with the temperature of 22.7° C. and the humidity of 100% for 60 hours; and after the modification, the activated carbon is taken out and placed in a constant temperature oven at 40° C. for 15 min.

(2) the dual-media adsorption column is filled with activated carbon and confined water modified activated carbon from bottom to top in sequence. The filling ratio is that activated carbon:confined water modified activated carbon=1:1.

(3) the simulated $C_{DOC}$=5.17 mg/L<20 mg/L and the turbidity=6.28 NTU<10 NTU in the sewage, which meets the requirements of the water quality of sewage entering the dual-media adsorption column. Sewage enters the adsorption column from bottom to top via a peristaltic pump, and the treatment time is set as 45 min.

The average concentration and the effluent risk of composite pollutants treated by raw water, the activated carbon adsorption column, the confined water modified activated carbon adsorption column and the dual-media adsorption column are shown in Table 3 and Table 4, respectively. After the treatment by the activated carbon adsorption column (control group 5), the concentration of composite pollutants is reduced by 27-77%, and the overall effluent risk is 0.0665 T.U.; after the treatment by the confined water modified activated carbon adsorption column (control group 6), the concentration of composite pollutants is reduced by 54-82%, and the overall effluent risk is 0.0422 T.U. After upgrading by this method, the dual-media adsorption column with the activated carbon: the confined water modified activated carbon=1:1 is selected. After treatment, the pollutant concentration is reduced by 71-92%, and the overall effluent risk is 0.0199 T.U. Therefore, after upgrading by this method, the treatment effect is significantly improved, and the overall effluent risk can be significantly reduced after the treatment by the dual-media adsorption column, and the effluent risk is reduced from 0.0665 T.U. (the activated carbon adsorption column) and 0.0422 T.U. (the confined water modified activated carbon adsorption column) to 0.0121 T.U. (the dual-media adsorption column), which is reduced by 70% and 55%, respectively. The risks of composite pollutants in sewage are reduced effectively, and the effluent safety is effectively ensured.

TABLE 3

Concentration of Composite Pollutants in Effluent Treated by the Adsorption Column in Embodiment 2

| Concentration of composite pollutants (ng/L) | Raw water (control group 4) | Effluent from the activated carbon adsorption column (control group 5) | Effluent from the confined water modified activated carbon adsorption column (control group 6) | Effluent from the dual-media adsorption column (1:1) (Embodiment 2) |
|---|---|---|---|---|
| Erythromycin | 203.30 | 63.02 | 93.52 | 16.26 |
| Carbamazepine | 631.23 | 75.75 | 239.87 | 69.43 |
| Salicylic acid | 131.04 | 32.76 | 38.00 | 38.00 |
| Metoprolol | 1031.60 | 288.85 | 330.11 | 330.11 |
| Acetylsalicylic acid | 182.98 | 64.04 | 75.02 | 42.08 |
| Chloromycetin | 205.53 | 53.44 | 36.99 | 47.27 |
| Trimethoprim | 5102.07 | 2193.89 | 1428.58 | 561.23 |
| Dagenan | 21.83 | 5.02 | 6.77 | 3.93 |
| Acetaminophen | 83.36 | 43.34 | 36.68 | 23.34 |
| Ofloxacin | 547.19 | 311.90 | 169.63 | 87.55 |
| Norfloxacin | 2966.27 | 1453.47 | 978.87 | 474.60 |
| Sulfadiazine | 69.28 | 31.87 | 14.55 | 5.54 |
| Tetracycline | 822.52 | 600.44 | 148.05 | 82.25 |

TABLE 4

Total Risk of Raw Water and Effluent Treated by the Adsorption Column in Embodiment 2

| | Raw water (control group 4) | Effluent from the activated carbon adsorption column (control group 5) | Effluent from the confined water modified activated carbon adsorption column (control group 6) | Effluent from the dual-media adsorption column (1:1) (Embodiment 2) |
|---|---|---|---|---|
| Total Risk of Effluent (T.U.) | 0.1317 | 0.0665 | 0.0422 | 0.0199 |

To sum up, by comparing the control group 4 with Embodiment 2, it can be seen that the adsorption (removal) effect of the composite pollutants using the method of Embodiment 2 of the present disclosure is better, and the removal rate can be improved by 2-3 times compared with the control group 4. The reason is that in Embodiment 2, the adsorption column is used for treatment, which shows that the adsorption column in Embodiment 2 can effectively remove composite pollutants.

By comparing the control group 5 and the control group 6 with Embodiment 2, it can be seen that the removal rate of various pollutants is significantly improved after using Embodiment 2 of the present disclosure to remove the composite pollutants, which shows that the adsorption effect of the adsorption column obtained by the dual-media ratio in Embodiment 2 of the present disclosure is better than that of the direct use of activated carbon or the direct use of modified activated carbon. The reason is that the method in Embodiment 2 can effectively remove the composite pollutants according to their characteristics using the dual-media adsorption column, which is a technical effect that cannot be achieved by a treatment method that has not been envisaged in the prior art where only the activated carbon modification is carried out.

Embodiment 3: different from Embodiment 1, the sewage used in the embodiment comes from the secondary effluent of a municipal sewage treatment plant in an inland city, and the basic water quality characteristics of the secondary effluent are as follows: the average pH value is 7.67, the average dissolved organic carbon value is 8.70 mg/L, and the average turbidity value is 7.45 NTU. The specific steps are as follows.

S1, the sewage sample is collected, and the concentration of dissolved organic carbon is measured to be 7.33 mg/L, that is, $C_{DOC}$=7.33 mg/L; and the total concentration of composite pollutants is measured to be 7830.78 ng/L, that is, $C_{HCP}$=7830.78 ng/L.

S2, the proportion P of the number of Dissolved Organic Matter (DOM) molecules with a modified aromaticity index $AI_{mod}\geq 0.5$ in sewage to the total number of dissolved organic matter molecules in sewage is measured. A total of 8849 DOM molecules are identified using the formula $$AI_{mod} = \frac{1 + C_n - 0.5O_n - S_n - 0.5(N_n + P_n + H_n)}{C_n - 0.5O_n - S_n - N_n - P_n}. \quad (1)$$

Figure 4:
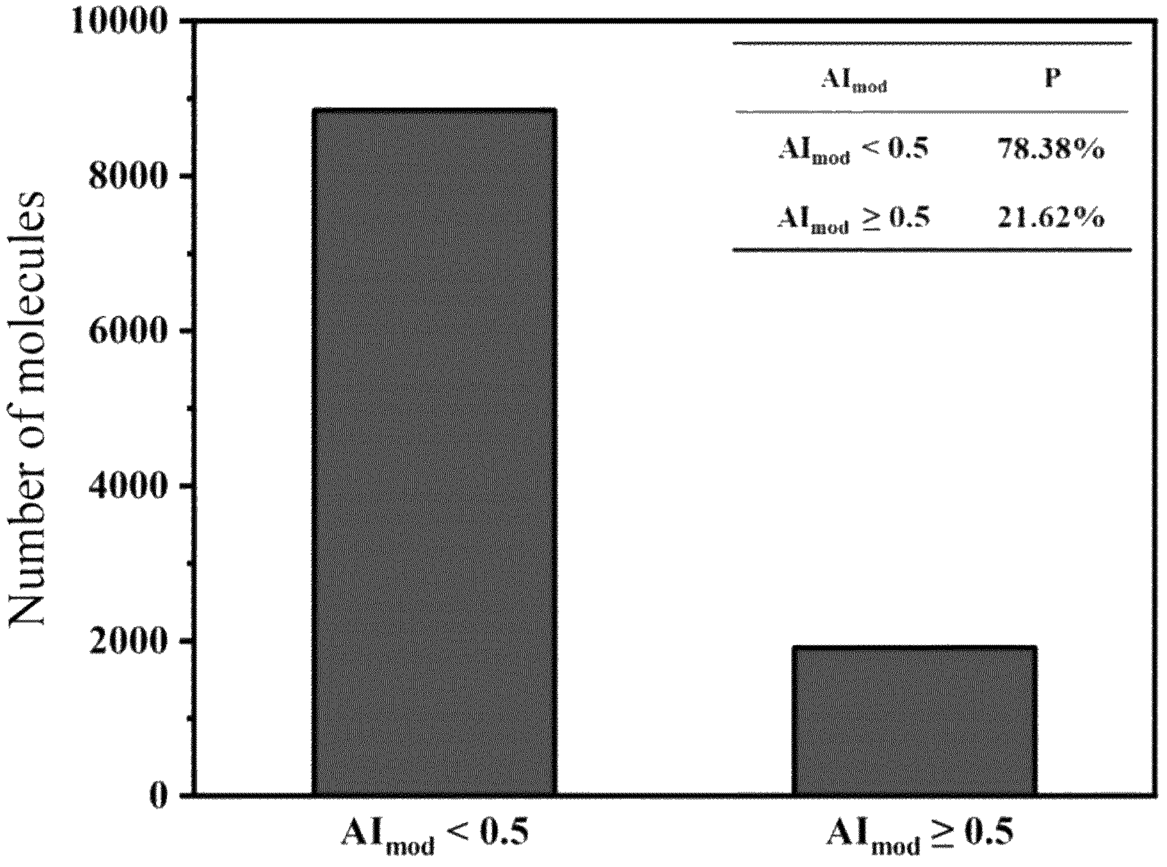
FIG. 4 is the $AI_{mod}$ distribution of DOM molecules in a secondary effluent sample in Embodiment 3 of the present disclosure.

The $AI_{mod}$ of the above molecules is calculated, in which the result is shown in FIG. 4. The proportion of DOMs with a modified aromaticity index $AI_{mod}\geq 0.5$ in water samples is calculated to obtain P=21.62%.

S3, an adsorption column filled with activated carbon and confined water modified activated carbon in a ratio of 2:1 is selected based on the ratio of the concentration of dissolved organic carbon to the total concentration of composite pollutants ($C_{DOC}/C_{HCP}$=936) and P(P=21.62%), and the specific operation steps are as follows.

(1) activated carbon is crushed and sieved to 0.3-0.5 mm, cleaning the activated carbon, and drying the activated carbon at 110° C. for 24 hours thoroughly; subsequently, the dried activated carbon is taken out and placed in a constant temperature and humidity chamber with the temperature of 22.3° C. and the humidity of 95% for 72 hours; and after the modification, the activated carbon is taken out and placed in a constant temperature oven at 30° C. for 20 min.

(2) the dual-media adsorption column is filled with activated carbon and confined water modified activated carbon from bottom to top in sequence. The filling ratio is that activated carbon:confined water modified activated carbon=2:1.

(3) the $C_{DOC}$=7.33 mg/L<20 mg/L and the turbidity=7.45 NTU<10 NTU in the sewage, which meets the requirements of the water quality of sewage entering the dual-media adsorption column. Sewage enters the adsorption column from bottom to top via a peristaltic pump, and the treatment time is 60 min.

The average concentration and the effluent risk of composite pollutants treated by raw water, the activated carbon adsorption column, the confined water modified activated carbon adsorption column and the dual-media adsorption column are shown in Table 5 and Table 6, respectively. After the treatment by the activated carbon adsorption column (control group 8), the concentration of composite pollutants is reduced by 16-45%, and the overall effluent risk is 0.0428 T.U.; after the treatment by the confined water modified activated carbon adsorption column (control group 9), the concentration of composite pollutants is reduced by 21-54%, and the overall effluent risk is 0.0333 T.U. After upgrading by this method, the dual-media adsorption column with the activated carbon: the confined water modified activated carbon=2:1 is selected. After treatment, the pollutant concentration is reduced by 32-72%, and the overall effluent risk is 0.0176 T.U. Therefore, after upgrading by this method, the treatment effect is significantly improved, and the overall effluent risk can be significantly reduced after the treatment by the dual-media adsorption column, and the effluent risk is reduced from 0.0428 T.U. (the activated carbon adsorption column) and 0.0333 T.U. (the confined water modified activated carbon adsorption column) to 0.0176 T.U. (the dual-media adsorption column), which is reduced by 58% and 47%, respectively. The risks of composite pollutants in sewage are reduced significantly.

TABLE 5

Concentration of Composite Pollutants in Effluent Treated by the Adsorption Column in Embodiment 3

| Concentration of composite pollutants (ng/L) | Raw water (control group 7) | Effluent from the activated carbon adsorption column (control group 8) | Effluent from the confined water modified activated carbon adsorption column (control group 9) | Effluent from the dual-media adsorption column (2:1) (Embodiment 3) |
|---|---|---|---|---|
| Erythromycin | 17.60 | 14.42 | 13.89 | 11.95 |
| Carbamazepine | 4214.00 | 2865.52 | 3329.06 | 2486.26 |
| Salicylic acid | 524.70 | 435.52 | 409.28 | 330.57 |
| Metoprolol | 221.50 | 121.83 | 152.84 | 121.83 |
| Acetylsalicylic acid | 249.30 | 191.96 | 177.00 | 134.62 |

TABLE 5-continued

Concentration of Composite Pollutants in Effluent Treated by the Adsorption Column in Embodiment 3

| Concentration of composite pollutants (ng/L) | Raw water (control group 7) | Effluent from the activated carbon adsorption column (control group 8) | Effluent from the confined water modified activated carbon adsorption column (control group 9) | Effluent from the dual-media adsorption column (2:1) (Embodiment 3) |
|---|---|---|---|---|
| Chloromycetin | 72.10 | 56.97 | 46.87 | 23.80 |
| Trimethoprim | 41.20 | 28.03 | 18.96 | 12.78 |
| Dagenan | 323.80 | 265.48 | 171.59 | 155.40 |
| Acetaminophen | 177.50 | 143.73 | 86.95 | 56.78 |
| Ofloxacin | 286.30 | 237.63 | 180.37 | 83.03 |
| Norfloxacin | 729.30 | 612.61 | 422.99 | 204.20 |
| Sulfadiazine | 81.30 | 68.33 | 41.48 | 38.23 |
| Tetracycline | 892.20 | 704.84 | 571.01 | 294.43 |

TABLE 6

Total Risk of Raw Water and Effluent Treated by the Adsorption Column in Embodiment 3

| | Raw water (control group 7) | Effluent from the activated carbon adsorption column (control group 8) | Effluent from the confined water modified activated carbon adsorption column (control group 9) | Effluent from the dual-media adsorption column (2:1) (Embodiment 3) |
|---|---|---|---|---|
| Total Risk of Effluent (T.U.) | 0.0529 | 0.0428 | 0.0333 | 0.0176 |

To sum up, by comparing the control group 7 with Embodiment 3, it can be seen that the adsorption (removal) effect of the composite pollutants using the method of Embodiment 3 of the present disclosure is better, and the removal rate can be improved more when compared with the control group 7. The reason is that in Embodiment 3, the adsorption column is used for treatment, which shows that the adsorption column in Embodiment 3 can effectively remove composite pollutants.

By comparing the control group 8 and the control group 9 with Embodiment 3, it can be seen that the removal rate of various pollutants is significantly improved after using Embodiment 3 of the present disclosure to remove the composite pollutants, which shows that the adsorption effect of the adsorption column obtained by the dual-media ratio in Embodiment 3 of the present disclosure is better than that of the direct use of activated carbon or the direct use of modified activated carbon. The reason is that the method in Embodiment 3 can effectively remove the composite pollutants according to their characteristics using the dual-media adsorption column, which is a technical effect that cannot be achieved by a treatment method that has not been envisaged in the prior art where only the activated carbon modification is carried out.

Embodiment 4: different from Embodiment 1, the method for preparing the confined water modified activated carbon is as follows: first, crushing, sieving and cleaning activated carbon, and then drying the activated carbon at 110° C. for 11 hours to obtain dried activated carbon; subsequently, taking out the dried activated carbon and placing the dried activated carbon in a constant temperature and humidity chamber with the temperature of 22° C. and the humidity of 95% for 72 hours for modification; and after the modification, taking out the activated carbon and placing the activated carbon in a constant temperature oven at 40° C. for 15 min to obtain the confined water modified activated carbon.

Embodiment 5: different from Embodiment 1, the method for preparing the confined water modified activated carbon is as follows: first, crushing, sieving and cleaning activated carbon, and then drying the activated carbon at 110° C. for 24 hours to obtain dried activated carbon; subsequently, taking out the dried activated carbon and placing the dried activated carbon in a constant temperature and humidity chamber with the temperature of 27° C. and the humidity of 200% for 40 hours for modification; and after the modification, taking out the activated carbon and placing the activated carbon in a constant temperature oven at 25° C. for 45 min to obtain the confined water modified activated carbon.

Embodiment 6: the sewage belongs to the effluent from the subsequent process stage (coagulation sedimentation tank) of the secondary effluent, the sewage is introduced into an adsorption column and is allowed to stand for 30 min.

Embodiment 7: the sewage belongs to the effluent from the subsequent process stage (cloth filter) of the secondary effluent, the sewage is introduced into an adsorption column and is allowed to stand for 44 min.

Embodiment 8: the sewage belongs to the effluent from the subsequent process stage (denitrification filter) of the secondary effluent, the sewage is introduced into an adsorption column and is allowed to stand for 35 min.

Embodiment 9: the sewage belongs to the effluent from the subsequent process stage (ultraviolet/ozone disinfection tank) of the secondary effluent, the sewage is introduced into an adsorption column and is allowed to stand for 40 min.

What is claimed is:

1. A method for reducing risks of composite pollutants in sewage, comprising the following steps:

S1, measuring a concentration $C_{DOC}$ of dissolved organic carbon and a total concentration $C_{HCP}$ of composite pollutants in sewage;

S2, calculating a proportion P of a number of dissolved organic matter molecules with a modified aromaticity index $AI_{mod} \geq 0.5$ in sewage to a total number of dissolved organic matter molecules in sewage;

S3, determining a filling ratio of two media in a dual-media adsorption column based on the ratio of the concentration $C_{DOC}$ of dissolved organic carbon to the total concentration $C_{HCP}$ of composite pollutants and the P, and then performing risk reduction treatment on the sewage by using the dual-media adsorption column;

wherein determining the filling ratio of the two media in a dual-media adsorption column for adsorbing sewage based on the ratio of the concentration of dissolved organic carbon to the total concentration of composite pollutants and the P comprises:

when $C_{DOC}/C_{HCP} \leq 1000$ and P≤20% in sewage, the filling ratio of the activated carbon to the confined water modified activated carbon is 1:1;

when $C_{DOC}/C_{HCP} \leq 1000$ and P>20% in sewage, the filling ratio of the activated carbon to the confined water modified activated carbon is 2:1;

when $C_{DOC}/C_{HCP} > 1000$ in sewage, the filling ratio of the activated carbon to the confined water modified activated carbon is 4:1.

2. The method for reducing risks of composite pollutants in sewage according to claim 1, wherein the sewage is a secondary effluent of a sewage treatment plant and a effluent from a subsequent process stage of the secondary effluent.

3. The method for reducing risks of composite pollutants in sewage according to claim 1, wherein the composite pollutants in Step S1 are organic matters in sewage with a logarithm of an octanol-water partition coefficient log-$K_{ow} \leq 2.5$.

4. The method for reducing risks of composite pollutants in sewage according to claim 1, wherein the method for calculating the modified aromaticity index $AI_{mod}$ in S2 is as follows:

for each dissolved organic matter molecule in sewage, determining the number of atoms of each element in the dissolved organic matter molecule first, and then substituting the number of atoms of each element into the following formula (1) to calculate the modified aromaticity index $AI_{mod}$;

$$AI_{mod} = \frac{1 + C_n - 0.5O_n - S_n - 0.5(N_n + P_n + H_n)}{C_n - 0.5O_n - S_n - N_n - P_n} \quad (1)$$

in formula (1), $AI_{mod}$ is a modified aromaticity index, $C_n$ is the number of atoms of carbon, $H_n$ is the number of atoms of hydrogen, $O_n$ is the number of atoms of oxygen, $N_n$ is the number of atoms of nitrogen, $S_n$ is the number of atoms of sulfur, and $P_n$ is the number of atoms of phosphorus;

the method for calculating the proportion P of the number of dissolved organic matter molecules with a modified aromaticity index $AI_{mod} \geq 0.5$ in sewage to the total number of dissolved organic matter molecules in sewage is shown in formula (2):

$$P = \frac{N_{AI_{mod} \geq 0.5}}{N_{Total}} \quad (2)$$

in formula (2), $N_{AI_{mod} \geq 0.5}$ is the number of dissolved organic matter molecules with a modified aromaticity index≥0.5 in a sewage water sample, and $N_{Total}$ is the total number of dissolved organic matter molecules in the sewage water sample.

5. The method for reducing risks of composite pollutants in sewage according to claim 1, wherein the two media in the dual-media adsorption column are activated carbon and confined water modified activated carbon, respectively, and the dual-media adsorption column is filled with activated carbon and confined water modified activated carbon from bottom to top in sequence;

wherein a method for preparing the confined water modified activated carbon comprises the following steps:

first, crushing, sieving and cleaning activated carbon, and then drying the activated carbon at 110° C. for 11-24 hours to obtain dried activated carbon; subsequently, taking out the dried activated carbon and placing the dried activated carbon in a constant temperature and humidity chamber with the temperature of 22-27° C. and the humidity of 95-200% for 40-72 hours for modification; and after the modification, taking out the activated carbon and placing the activated carbon in a constant temperature oven at 25-40° C. for 15-45 min to obtain the confined water modified activated carbon.

6. The method for reducing risks of composite pollutants in sewage according to claim 5, wherein a particle size of the obtained activated carbon is 0.3-0.5 mm after the crushing and sieving.

7. The method for reducing risks of composite pollutants in sewage according to claim 5, wherein the method for performing risk reduction treatment on the sewage by using the dual-media adsorption column in S3 comprises: introducing the sewage into the adsorption column and allowing the sewage to stand for 30-60 min, and completing the risk reduction treatment.

8. The method for reducing risks of composite pollutants in sewage according to claim 7, wherein when the sewage belongs to secondary effluent, the sewage is introduced into the adsorption column and is allowed to stand for 45-60 min; when the sewage belongs to the effluent from the subsequent process stage of the secondary effluent, the sewage is introduced into an adsorption column and is allowed to stand for 30-44 min; wherein the secondary effluent subsequent process stage comprises a coagulation sedimentation tank, a cloth filter, a denitrification filter and an ultraviolet/ozone disinfection tank.

* * * * *